United States Patent
Wang

(10) Patent No.: US 11,671,402 B2
(45) Date of Patent: Jun. 6, 2023

(54) SERVICE RESOURCE SCHEDULING METHOD AND APPARATUS

(71) Applicant: HUAWEI TECHNOLOGIES CO., LTD., Guangdong (CN)

(72) Inventor: Zhaoqi Wang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 11 days.

(21) Appl. No.: 17/119,720

(22) Filed: Dec. 11, 2020

(65) Prior Publication Data

US 2021/0144120 A1    May 13, 2021

Related U.S. Application Data

(63) Continuation of application No. PCT/CN2019/082472, filed on Apr. 12, 2019.

(30) Foreign Application Priority Data

Jun. 15, 2018 (CN) .......................... 201810619416.X

(51) Int. Cl.
*H04L 61/5061* (2022.01)
*H04L 61/4511* (2022.01)
(Continued)

(52) U.S. Cl.
CPC ...... *H04L 61/5061* (2022.05); *H04L 61/4511* (2022.05); *H04L 61/5007* (2022.05); *H04L 63/14* (2013.01)

(58) Field of Classification Search
CPC ............. H04L 61/1511; H04L 61/2061; H04L 61/2007
See application file for complete search history.

(56) References Cited

U.S. PATENT DOCUMENTS

| | | | |
|---|---|---|---|
| 7,873,695 B2* | 1/2011 | Clegg | G06Q 10/107 709/206 |
| 8,560,616 B1* | 10/2013 | Diac | H04L 51/212 709/229 |

(Continued)

FOREIGN PATENT DOCUMENTS

| | | |
|---|---|---|
| CN | 101339593 A | 1/2009 |
| CN | 101499996 A | 8/2009 |

(Continued)

*Primary Examiner* — Hitesh Patel
*Assistant Examiner* — Alex H. Tran
(74) *Attorney, Agent, or Firm* — Womble Bond Dickinson (US) LLP

(57) ABSTRACT

This application discloses a service resource scheduling method and apparatus, and relates to the field of information security technologies, to resolve a problem that a legitimate user in attack traffic cannot normally use a service of a tenant or an access speed becomes slow when a hacker attack occurs. The method includes: receiving, by a domain name system server, a domain name resolution request sent by a first terminal, where the domain name resolution request includes a domain name; selecting, based on a terminal reputation value of the first terminal and an IP reputation value of each virtual IP address in an IP address resource pool, a virtual IP address from at least two virtual IP addresses included in the IP address resource pool; and sending a domain name resolution response to the first terminal, where the domain name resolution response carries the selected virtual IP address.

19 Claims, 5 Drawing Sheets

(51) Int. Cl.
    *H04L 61/5007*     (2022.01)
    *H04L 9/40*     (2022.01)

(56) References Cited

U.S. PATENT DOCUMENTS

| | | | |
|---|---|---|---|
| 8,613,089 B1* | 12/2013 | Holloway | H04L 63/1466 |
| | | | 709/227 |
| 8,631,465 B2* | 1/2014 | Ikeda | H04L 63/102 |
| | | | 726/28 |
| 9,742,795 B1* | 8/2017 | Radlein | H04L 63/0218 |
| 9,853,975 B2* | 12/2017 | Kaladgi | G06F 21/6218 |
| 10,375,011 B2* | 8/2019 | Araújo | H04L 61/4511 |
| 10,904,277 B1* | 1/2021 | Sharifi Mehr | H04L 63/1425 |
| 2006/0182103 A1* | 8/2006 | Martini | H04L 63/0428 |
| | | | 370/389 |
| 2009/0019523 A1* | 1/2009 | Takahashi | H04L 63/105 |
| | | | 726/3 |
| 2016/0156637 A1* | 6/2016 | Klein | H04L 63/105 |
| | | | 726/4 |
| 2016/0234249 A1 | 8/2016 | Wong | |
| 2017/0006053 A1* | 1/2017 | Greenberg | H04L 63/1425 |

FOREIGN PATENT DOCUMENTS

| | | |
|---|---|---|
| CN | 103023924 A | 4/2013 |
| CN | 103428310 A | 12/2013 |
| CN | 106302313 A | 1/2017 |
| WO | 2007062075 A2 | 5/2007 |

\* cited by examiner

SERVICE RESOURCE SCHEDULING METHOD AND APPARATUS

CROSS-REFERENCE TO RELATED APPLICATIONS

This application is a continuation of International Application No. PCT/CN2019/082472, filed on Apr. 12, 2019, which claims priority to Chinese Patent Application No. 201810619416.X, filed on Jun. 15, 2018. The disclosures of the aforementioned applications are hereby incorporated by reference in their entireties.

TECHNICAL FIELD

Embodiments of this application relate to the field of information security technologies, and in particular, to a service resource scheduling method and apparatus.

BACKGROUND

An implementation of a cloud-based service is that a network service provider leases a server cluster provided by a network infrastructure provider, and these servers provide a service for a user by using a virtual IP address. The network service provider can be considered as a "tenant" of a network infrastructure. When the user accesses a domain name of the network service provider, the domain name is first resolved to a virtual IP address, and then the user accesses the virtual IP address to enjoy a network service.

To ensure security of the cloud-based service, a cloud-based distributed denial of service (DDoS) attack defense service and a cloud firewall product are proposed. The cloud-based DDoS attack defense service or the cloud firewall product uses a plurality of network security devices to perform security detection on traffic accessing a protected server. When a network security device is faulty or attacked, the traffic may be switched to another network security device for security detection. This ensures security of the protected server and service availability for the user.

An important feature of the cloud-based DDoS attack defense service or the cloud firewall product is threat-based scheduling and resolution. Each network security device has a virtual IP address, and a domain name of a tenant is resolved to a virtual IP address of one of the network security devices. When the user accesses the virtual IP address, a network security device corresponding to the virtual IP address performs threat detection on a packet from the user. If the packet has no threat, the packet is redirected to a real protected server. The threat-based scheduling and resolution mean that in the cloud-based DDoS attack defense service and a cloud firewall, the domain name of the tenant may be randomly scheduled and resolved to another available virtual IP address based on an attack status of a tenant service. For example, when a virtual IP address used by a current tenant service is attacked, the cloud-based DDoS attack defense service and the cloud firewall stop resolving a domain name of the tenant to the attacked virtual IP address, and resolve the domain name to another available virtual IP address, to provide a service for the user by using the another available virtual IP address. In other words, attack detection is combined with domain name system (DNS) resolution, or attack detection is combined with HTTP-based DNS (HTTPDNS) resolution, to effectively distribute attacks at different levels to network security devices that are with different bandwidth sizes and that resist the attacks, thereby effectively mitigating the attacks, clearing abnormal traffic, and ensuring service continuity.

For example, a domain name of a tenant is www.abc.com, and an IP address resource pool corresponding to the domain name www.abc.com includes a VIP 1 and a VIP 2. The VIP 1 is an IP address of a network security device 1. The VIP 2 is an IP address of a network security device 2. As shown in FIG. 1, when a user initiates an access request to the domain name (www.abc.com), a DNS server finds that a virtual IP address corresponding to the domain name www.abc.com is the VIP 1, and returns a domain name resolution result VIP 1 to the user. The user accesses the VIP 1 to obtain a service such as a web page provided by the domain name www.abc.com. If a hacker attacks the VIP 1 and the network security device 1 corresponding to the VIP 1 determines that attack traffic exceeds a threshold, the network security device 1 may report attack information to a scheduling module. The scheduling module updates a status of the VIP 1 to unavailable or being attacked; queries the domain name of the tenant based on the VIP 1; queries, based on the domain name of the tenant, that an available VIP in the IP address resource pool is the VIP 2; and instructs the DNS to update the resolved address of the domain name www.abc.com to the VIP 2, to transfer the attack traffic to the network security device 2 corresponding to the VIP 2.

According to the foregoing scheduling method that is based on attack information reported by a network security device, after an attack occurs, traffic for accessing a tenant service is switched to another network security device, and the traffic includes traffic from the hacker and traffic from a legitimate user. In this way, quality of a service for the legitimate user may be affected. Consequently, the legitimate user cannot normally use the tenant service, or an access speed becomes slow.

SUMMARY

Embodiments of this application provide a service resource scheduling method and apparatus to resolve a problem that a legitimate user cannot normally use a tenant service or an access speed becomes slow when a conventional cloud-based DDoS attack defense service or a conventional cloud firewall product is scheduled to cope with an attack.

According to a first aspect, a service resource scheduling method is provided, that is applied to a network including a terminal, a service server, a domain name system server, and at least one network security device. Each of the at least one network security devices has a virtual IP address. A domain name of a service provided by the service server is mapped to an IP address resource pool on the domain name system server. The IP address resource pool includes at least two of the virtual IP addresses. The method includes: receiving, by the domain name system server, a domain name resolution request sent by a first terminal, where the domain name resolution request includes the domain name; selecting, based on a terminal reputation value of the first terminal and an IP reputation value of each virtual IP address in the IP address resource pool, a virtual IP address from the at least two virtual IP addresses included in the IP address resource pool, where a terminal reputation value of a terminal is used to indicate a security level of the terminal, and an IP reputation value of a virtual IP address is used to indicate a security level of the virtual IP address; and sending a domain name resolution response to the first terminal, where the domain name resolution response carries the selected virtual IP address.

In the foregoing technical solution, the domain name system server selects a virtual IP address for the terminal by using the terminal reputation value of the terminal and the IP reputation value of each virtual IP address in the IP address resource pool, so that the terminal may enjoy a network service by accessing the selected virtual IP address. In other words, different network security devices are selected to provide security assurance for different terminals to access a same network service. In this way, when a hacker attack occurs, only traffic of a few terminals is scheduled to another network security device, and access traffic of most legitimate users is not switched, so that most legitimate users can normally use a tenant service, and service quality is not affected.

In one embodiment of the first aspect, the selecting, based on a terminal reputation value of the first terminal and an IP reputation value of each virtual IP address in the IP address resource pool, a virtual IP address from the at least two virtual IP addresses included in the IP address resource pool, includes: if the terminal reputation value of the first terminal is greater than or equal to a first user threshold, determining a first virtual IP address set from the IP address resource pool, where an IP reputation value of each virtual IP address in the first virtual IP address set is greater than or equal to a first service threshold; and selecting a virtual IP address from the first virtual IP address set. In the foregoing embodiment, the domain name system server may select a virtual IP address with a higher security level for a terminal with a higher security level, to ensure that the terminal with a higher security level can enjoy a higher-quality service. In this way, network performance is improved and user experience is enhanced.

In one embodiment of the first aspect, the method further includes: receiving, by the domain name system server, a domain name resolution request sent by a second terminal, where the domain name resolution request sent by the second terminal includes the domain name; if a terminal reputation value of the second terminal is less than a second user threshold, determining a second virtual IP address set from the IP address resource pool, where an IP reputation value of each virtual IP address in the second virtual IP address set is less than a second service threshold, the first user threshold is greater than or equal to the second user threshold, and the first service threshold is greater than or equal to the second service threshold; selecting a virtual IP address from the second virtual IP address set; and sending a domain name resolution response to the second terminal, where the domain name resolution carries the virtual IP address selected from the second virtual IP address set. In the foregoing embodiment, the domain name system server may select a virtual IP address with a lower security level for a terminal with a lower security level, to ensure that the terminal with a lower security level enjoys a lower-quality service. In this way, impact caused by the terminal with a lower security level on access of another terminal is avoided, and the network performance is improved.

In one embodiment of the first aspect, the method further includes: obtaining the terminal reputation value of the first terminal and the IP reputation value of each virtual IP address.

In one embodiment of the first aspect, the obtaining the terminal reputation value of the first terminal includes: receiving the terminal reputation value of the first terminal sent by the first terminal; or receiving a terminal device parameter sent by the first terminal, and determining the terminal reputation value of the first terminal based on the terminal device parameter. In the foregoing embodiment, several manners are provided for the domain name system server to obtain the terminal reputation value, so that diversity of obtaining the terminal reputation value is improved. In addition, power consumption of obtaining the terminal reputation value by the domain name system server may be reduced by receiving the terminal reputation value sent by the terminal.

In one embodiment of the first aspect, the terminal reputation value of the first terminal is carried in the domain name resolution request sent by the first terminal, or the terminal device parameter of the first terminal is carried in the domain name resolution request sent by the first terminal. In the foregoing embodiment, a quantity of signaling interactions between the domain name system server and the terminal is reduced.

In one embodiment of the first aspect, the terminal device parameter includes at least one hardware fingerprint, and the determining the terminal reputation value of the first terminal based on the terminal device parameter includes: querying a preset reputation score corresponding to each hardware fingerprint of the at least one hardware fingerprint, and determining the terminal reputation value of the first terminal based on the preset reputation score corresponding to each hardware fingerprint. The at least one hardware fingerprint includes one or more of the following: a GPS fingerprint, a Bluetooth fingerprint, a battery fingerprint, a camera fingerprint, a Wi-Fi module fingerprint, a temperature sensor fingerprint, or a microphone module fingerprint.

In one embodiment of the first aspect, the terminal device parameter further includes at least one software fingerprint, and the determining the terminal reputation value of the first terminal based on the terminal device parameter further includes: querying a preset reputation score corresponding to each software fingerprint of the at least one software fingerprint, and determining the terminal reputation value of the first terminal based on the preset reputation score corresponding to each software fingerprint. The at least one software fingerprint includes one or more of the following: an international mobile equipment identity (IMEI), a universally unique identifier (UUID), a network type, a terminal type, an operating system type, a network mode, a battery temperature, a power feature, a mobile phone model, a SIM card serial number, and a mobile phone number.

In one embodiment of the first aspect, the terminal device parameter further includes at least one piece of malicious information, and the determining the terminal reputation value of the first terminal based on the terminal device parameter further includes: querying a preset reputation score corresponding to each piece of malicious information of the at least one piece of malicious information, and determining the terminal reputation value of the first terminal based on the preset reputation score corresponding to each piece of malicious information. The at least one piece of malicious information includes one or more of the following: CPU malicious information, malicious information corresponding to a file stored in a memory, API DEMOS malicious information, DevTools malicious information, application permission malicious information, abnormal port information, and abnormal process information.

In one embodiment of the first aspect, the terminal device parameter further includes transmission traffic and a quantity of connections, and the determining the terminal reputation value of the first terminal based on the terminal device parameter further includes: updating the terminal reputation value of the first terminal when the quantity of connections and/or the transmission traffic are/is abnormal.

In one embodiment of the first aspect, the obtaining the IP reputation value of each virtual IP address includes: receiving attack information sent by one of the at least one network security device, where the attack information includes an attacked IP address; and determining the IP reputation value of each virtual IP address based on the attacked IP address.

In one embodiment of the first aspect, the attack information further includes an IP address of an attack source, and the method further includes: if the IP address of the attack source is an IP address of the first terminal, updating the terminal reputation value of the first terminal.

In the foregoing embodiments, the domain name system server may ensure validity of the terminal reputation value and the IP reputation value of each virtual IP address by determining or updating the terminal reputation value and the IP reputation value of each virtual IP address. In this way, it is ensured that an appropriate virtual IP address is selected from the IP address resource pool based on the terminal reputation value and the IP reputation value of each virtual IP address. Therefore, accuracy of virtual IP address selection is improved.

According to a second aspect, a service resource scheduling method is provided that is applied to a network including a terminal, a service server, a domain name system server, and at least one network security device. Each of the at least one network security device has a virtual IP address. On the domain name system server, a domain name of a service provided by the service server is mapped to an IP address resource pool. The IP address resource pool includes at least two of the virtual IP addresses. The method includes: obtaining, by the terminal, a terminal device parameter, where the terminal device parameter is used to determine a terminal reputation value of the terminal, and the terminal reputation value is used to indicate a security level of the terminal; sending a domain name resolution request to the domain name system server, where the domain name resolution request includes the domain name; and receiving a domain name resolution response sent by the domain name system server. The domain name resolution response carries a virtual IP address in the IP address resource pool. The virtual IP address carried in the domain name resolution response is selected by the domain name system server from the IP address resource pool based on the reputation value of the terminal and the IP reputation value of each virtual IP address in the IP address resource pool. An IP reputation value of a virtual IP address is used to indicate a security level of the virtual IP address.

In the foregoing technical solution, the terminal obtains the terminal device parameter, so that the domain name system server selects a virtual IP address for the terminal based on the IP reputation value of each virtual IP address in the IP address resource pool and the terminal reputation value that is determined based on the terminal device parameter. In this way, the terminal accesses a network security device corresponding to the selected virtual IP address, to ensure security of the terminal in enjoying a network service. In this way, when a hacker attack occurs, a probability that service quality of the terminal decreases can be reduced.

In one embodiment of the second aspect, before the sending a domain name resolution request to the domain name system server, the method includes: sending the terminal device parameter to the domain name system server; or determining the terminal reputation value based on the terminal device parameter, and sending the terminal reputation value to the domain name system server. In the foregoing embodiment, several manners are provided to obtain the terminal reputation value, so that diversity of obtaining the terminal reputation value is improved. In addition, the terminal device parameter is sent to the domain name system server, so that power consumption of the terminal can be reduced when the domain name system server determines the terminal reputation value based on the terminal device parameter.

In one embodiment of the second aspect, the terminal device parameter or the terminal reputation value is carried in the domain name resolution request. In the foregoing embodiment, a quantity of signaling interactions between the domain name system server and the terminal is reduced.

In one embodiment of the second aspect, the terminal device parameter includes at least one hardware fingerprint, and the determining the terminal reputation value based on the terminal device parameter includes: querying a preset reputation score corresponding to each hardware fingerprint of the at least one hardware fingerprint, and determining the terminal reputation value based on the preset reputation score corresponding to each hardware fingerprint. The at least one hardware fingerprint includes one or more of the following: a GPS fingerprint, a Bluetooth fingerprint, a battery fingerprint, a camera fingerprint, a Wi-Fi module fingerprint, a temperature sensor fingerprint, and a microphone module fingerprint.

In one embodiment of the second aspect, the terminal device parameter further includes at least one software fingerprint, and the determining the terminal reputation value based on the terminal device parameter further includes: querying a preset reputation score corresponding to each software fingerprint of the at least one software fingerprint, and determining the terminal reputation value based on the preset reputation score corresponding to each software fingerprint. The at least one software fingerprint includes one or more of the following: an international mobile equipment identity (IMEI), a universally unique identifier (UUID), a network type, a terminal type, an operating system type, a network mode, a battery temperature, a power feature, a SIM card serial number, and a mobile phone number.

In one embodiment of the second aspect, the terminal device parameter further includes at least one piece of malicious information, and the determining the terminal reputation value based on the terminal device parameter further includes: querying a preset reputation score corresponding to each piece of malicious information of the at least one piece of malicious information, and determining the terminal reputation value based on the preset reputation score corresponding to each piece of malicious information. The at least one piece of malicious information includes one or more of the following: CPU malicious information, malicious information corresponding to a file stored in a memory, API DEMOS malicious information, DevTools malicious information, application permission malicious information, abnormal port information, and abnormal process information.

In one embodiment of the second aspect, the terminal device parameter further includes transmission traffic and a quantity of connections, and the determining the terminal reputation value based on the terminal device parameter further includes: updating the terminal reputation value when the quantity of connections and/or the transmission traffic are/is abnormal.

In the foregoing embodiments, the terminal may ensure validity of the terminal reputation value by determining or updating the terminal reputation value. In this way, it is ensured that an appropriate virtual IP address is selected from the IP address resource pool based on the terminal reputation value and the IP reputation value of each virtual IP address. Therefore, accuracy of virtual IP address selection is improved.

According to a third aspect, a domain name system server is provided. The domain name system server may implement a function of the service resource scheduling method provided in the first aspect and any embodiment of the first aspect. The function may be implemented by hardware, or may be implemented by hardware by executing corresponding software. The hardware or the software includes one or more units corresponding to the function.

In one embodiment of the third aspect, the domain name system server includes a processor, a memory, a communications interface, and a bus. The processor, the memory, and the communications interface are connected by using the bus. The memory is configured to store program code. The communications interface is configured to support the domain name system server in performing communication. When the program code is executed by the processor, the domain name system server is enabled to perform the operations in the service resource scheduling method provided in the first aspect or any embodiment of the first aspect.

According to a fourth aspect, a terminal is provided. The terminal may implement a function of the service resource scheduling method provided in the second aspect and any embodiment of the second aspect. The function may be implemented by hardware, or may be implemented by hardware by executing corresponding software. The hardware or the software includes one or more units corresponding to the function.

In one embodiment of the fourth aspect, the terminal includes a processor, a memory, a communications interface, and a bus. The processor, the memory, and the communications interface are connected by using the bus. The memory is configured to store program code. The communications interface is configured to support the domain name system server in performing communication. When the program code is executed by the processor, the terminal is enabled to perform the operations in the service resource scheduling method provided in the second aspect or any embodiment of the second aspect.

According to a fifth aspect, a system is provided. The system includes a terminal, a service server, a domain name system server, and at least one network security device. The domain name system server is the domain name system server provided in the third aspect or any embodiment of the third aspect, and/or the terminal is the terminal provided in the fourth aspect or any embodiment of the fourth aspect.

According to another aspect of this application, a computer-readable storage medium is provided. The computer-readable storage medium stores an instruction, and when the instruction is run on a computer, the computer is enabled to perform the service resource scheduling method provided in the first aspect or any embodiment of the first aspect.

According to another aspect of this application, a computer-readable storage medium is provided. The computer-readable storage medium stores an instruction, and when the instruction is run on a computer, the computer is enabled to perform the service resource scheduling method provided in the second aspect or any embodiment of the second aspect.

According to another aspect of this application, a computer program product including an instruction is provided. When the computer program product runs on a computer, the computer is enabled to perform the service resource scheduling method provided in the first aspect or any embodiment of the first aspect.

According to another aspect of this application, a computer program product including an instruction is provided. When the computer program product runs on a computer, the computer is enabled to perform the service resource scheduling method provided in the second aspect or any embodiment of the second aspect.

According to another aspect of this application, a chip system is provided. The chip system includes a memory, a processor, a bus, and a communications interface. The memory stores code and data. The processor is connected to the memory by using the bus. The processor runs the code in the memory, to enable the chip system to perform the service resource scheduling method provided in the first aspect or any embodiment of the first aspect.

According to another aspect of this application, a chip system is provided. The chip system includes a memory, a processor, a bus, and a communications interface. The memory stores code and data. The processor is connected to the memory by using the bus. The processor runs the code in the memory, to enable the chip system to perform the service resource scheduling method provided in the second aspect or any embodiment of the second aspect.

It may be understood that the apparatus, the computer storage medium, or the computer program product of any service resource scheduling method provided above are used to perform a corresponding method described above. Therefore, for a beneficial effect that can be achieved by the apparatus, the computer storage medium, or the computer program product, refer to a beneficial effect of the corresponding method, and details are not described herein again.

DESCRIPTION OF EMBODIMENTS

In this application, "at least one" refers to one or more, and "a plurality of" refers to two or more. The term "and/or" describes an association relationship between associated objects and may indicate three relationships. For example, A and/or B may indicate the following cases: Only A exists, both A and B exist, and only B exists, where A and B may be singular or plural. The character "|" generally indicates an "or" relationship between the associated objects. "At least one (one piece) of the following" or a similar expression thereof refers to any combination of these items, including any combination of singular items (pieces) or plural items (pieces). For example, at least one (one piece) of a, b, or c may indicate: a, b, c, a-b, a-c, b-c, or a-b-c, where a, b, and c may be singular or plural.

It should be noted that, in this application, the word "for example" or "such as" is used to represent giving an example, an illustration, or a description. Any embodiment or design scheme described as "for example" or "such as" in this application should not be interpreted as being preferable or having more advantages than another embodiment or design scheme. Use of the word "for example", "such as", or the like is intended to present a related concept in a particular manner.

The following describes the technical solutions in the embodiments of this application with reference to the accompanying drawings in the embodiments of this application.

Figure 1:
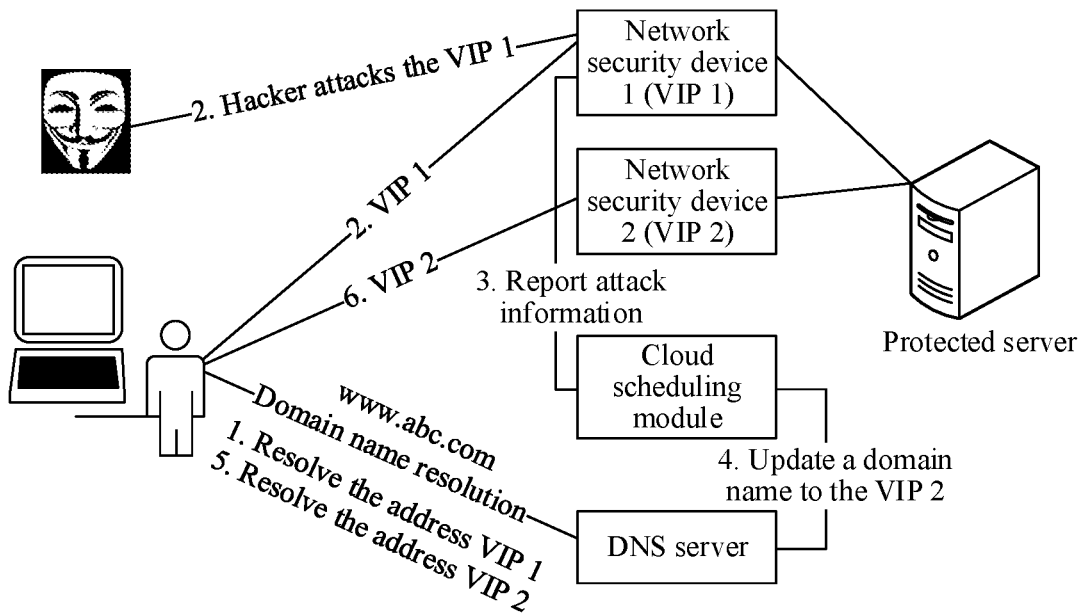
FIG. 1 is a schematic diagram of scheduling a service resource in the prior art.
Figure 2:
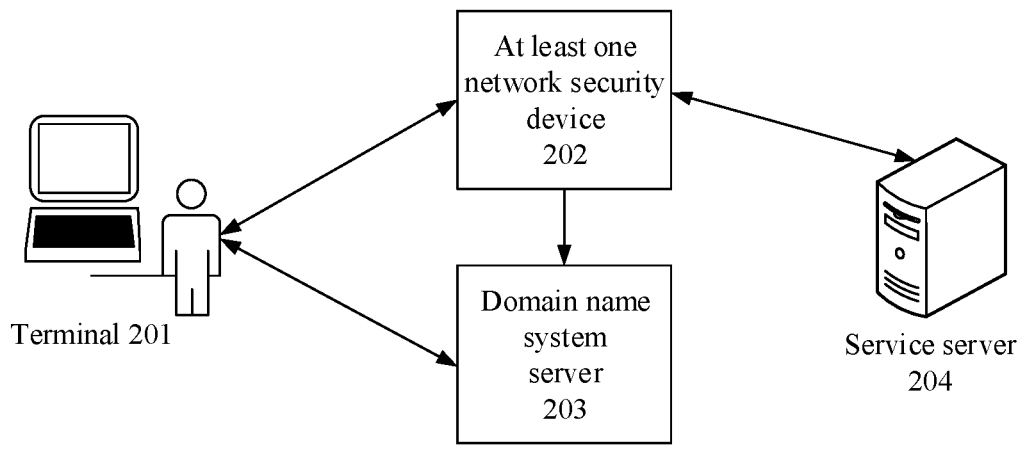
FIG. 2 is a schematic diagram of a network system architecture according to an embodiment of this application.

A service resource scheduling method provided in this application may be applicable to a plurality of network system architectures. FIG. 2 is a schematic diagram of a network system architecture according to an embodiment of this application. As shown in FIG. 2, the network system architecture includes a terminal 201, at least one network security device 202, a domain name system server 203, and a service server 204.

The terminal 201 may include one or more terminals. The terminal 201 may include a handheld device (for example, a mobile phone or a tablet computer), a computer, a vehicle-mounted device, an intelligent wearable device, and the like. Client software provided by a network service provider may be installed on the terminal 201, for example, a game client, a mobile phone shopping client, an instant messaging client, and a browser. The client software may be configured to initiate a service.

The service server 204 is a server that provides various services for the terminal 201. For example, the service server 204 may be a Web server, a file transfer protocol (FTP) application server, a game application server, an e-commerce application server, or the like.

The domain name system server 203 may be configured to provide a domain name resolution function for the terminal 201, and manage a relationship between domain names of different network service providers and virtual IP addresses leased by the different network service providers. When a user accesses a domain name of the network service provider, the domain name is first resolved to a virtual IP address, and then the user accesses the virtual IP address to enjoy a network service provided by the service server 204. For example, the domain name system server 203 may be a DNS server, an HTTPDNS server, or a server in which the DNS server and the TTPDNS server are integrated.

The at least one network security device 202 may be a network security device in a cloud, and includes one or more network security devices. The at least one network security device 202 is configured to provide security protection for the service server 204. For example, each network security device may monitor and perform security detection on traffic sent to the service server 204, intercept and filter malicious traffic, to protect security of the service server 204. Each of the at least one network security device 202 may correspond to a virtual IP address.

In one embodiment, when the user accesses the domain name of the network service provider, the domain name is first resolved into the virtual IP address by using the domain name system server 203, and the resolved virtual IP address is sent to the user. Then, the user accesses a network security device corresponding to the virtual IP address to enjoy the network service provided by the service server 204. When accessing the virtual IP address, the network security device monitors and performs security detection on traffic sent by the user. If the traffic sent by the user has no threat, the traffic may be redirected to the service server 204, to provide a corresponding network service for the user. The security of the service server 204 may be ensured by monitoring and performing security detection on the traffic sent by the user.

Figure 3:
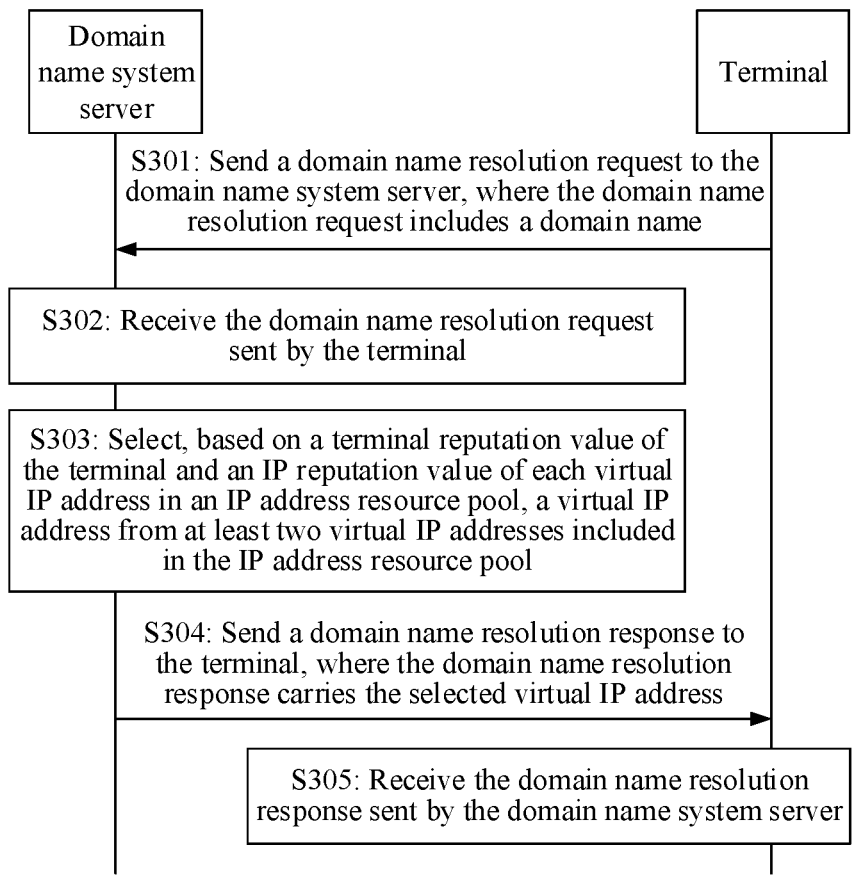
FIG. 3 is a schematic flowchart of a service resource scheduling method according to an embodiment of this application.

FIG. 3 is a schematic flowchart of a service resource scheduling method according to an embodiment of this application. The method is applied to a network including a terminal, a service server, a domain name system server and at least one network security device. Each of the at least one network security device has a virtual IP address. A domain name of a service provided by the service server on the domain name system server is mapped to an IP address resource pool. The IP address resource pool includes at least two of the virtual IP addresses. Refer to FIG. 3. The method includes the following operations.

S301: The terminal sends a domain name resolution request to the domain name system server, where the domain name resolution request includes the domain name.

S302: The domain name system server receives the domain name resolution request sent by the terminal, where the domain name resolution request is consistent with that in S301.

The domain name is the domain name of the service provided by the service server. The domain name system server may be configured to provide a domain name resolution function for the terminal. When the terminal needs to access the service provided by the service server, the terminal may send the domain name resolution request to the domain name system server, and the domain name resolution request carries the domain name. The domain name resolution request may be used to request the domain name system server to perform domain name resolution on the domain name. Therefore, the domain name system server may receive the domain name resolution request including the domain name.

For example, a domain name of the service provided by the service server is www.abc.com. When the terminal needs to access the service provided by the service server, the terminal sends a domain name resolution request carrying the domain name www.abc.com to the domain name system server, so that the domain name system server may receive the domain name resolution request including the domain name www.abc.com.

S303: The domain name system server selects, based on a terminal reputation value of the terminal and an IP reputation value of each virtual IP address in the IP address resource pool, a virtual IP address from the at least two virtual IP addresses included in the IP address resource pool.

The terminal reputation value of the terminal is used to indicate a security level of the terminal. In other words, the terminal reputation value of the terminal is related to the security level of the terminal. A calculation manner may be flexibly set based on an actual situation and a working habit of an administrator. For example, the terminal reputation value of the terminal may be positively correlated with the security level of the terminal. In one embodiment, a larger terminal reputation value of the terminal indicates a higher security level of the terminal; and a smaller terminal reputation value of the terminal indicates a lower security level of the terminal. Alternatively, the terminal reputation value of the terminal may be inversely correlated with the security level of the terminal. In one embodiment, a smaller terminal reputation value of the terminal indicates a higher security level of the terminal; and a larger terminal reputation value of the terminal indicates a lower security level of the terminal. A relationship between the terminal reputation value of the terminal and the security level of the terminal is not limited in this embodiment of this application.

The IP resource pool includes at least two of the virtual IP addresses. Each of the at least two virtual IP addresses has an IP reputation value. An IP reputation value of a virtual IP address is used to indicate a security level of the virtual IP address. A larger IP reputation value of the virtual IP address indicates a higher security level of the virtual IP address. Therefore, when a terminal accesses, by using the virtual IP address, the service provided by the service server, service quality of the service enjoyed by the terminal may be higher. A smaller IP reputation value of the virtual IP address indicates a lower security level of the virtual IP address. Therefore, when a terminal accesses, by using the virtual IP address, the service provided by the service server, the service quality of the service enjoyed by the terminal may be lower.

In one embodiment, when the domain name system server selects, based on the terminal reputation value of the terminal and the IP reputation value of each virtual IP address in the IP address resource pool, the virtual IP address from the at least two virtual IP addresses included in the IP address resource pool, the following manners may be used for selection: When the terminal reputation value is greater than or equal to a first user threshold, a first virtual IP address set is determined from the IP address resource pool. An IP reputation value of each virtual IP address in the first virtual IP address set is greater than or equal to a first service threshold. A virtual IP address is selected from the first virtual IP address set. Alternatively, when the terminal reputation value is less than a second user threshold, a second virtual IP address set is determined from the IP address resource pool. An IP reputation value of each virtual IP address in the second virtual IP address set is less than a second service threshold. A virtual IP address is selected from the second virtual IP address set.

For ease of understanding, the following assumes that the terminal reputation value of the terminal is positively correlated with the security level of the terminal, and describes, by using an example, a process in which the domain name system server selects the virtual IP address from the IP address resource pool based on the terminal reputation value of the terminal and the IP reputation value of each virtual IP address in the IP address resource pool.

For example, the domain name of the service provided by the service server is www.abc.com. On the domain name system server, an IP address resource pool mapped to the domain name www.abc.com includes a VIP 1, a VIP 2, a VIP 3, and a VIP 4. The VIP 1, the VIP 2, the VIP 3, and the VIP 4 are virtual IP addresses of four different network security devices. A terminal a and a terminal b separately request domain name resolution of the domain name www.abc.com from the domain name system server. It is assumed that terminal reputation values of the terminal a and the terminal b are respectively 7 and 2; IP reputation values of the VIP 1 to the VIP 4 are respectively 3, 5, 7, and 9; the first user threshold and the second user threshold are respectively 6 and 3; and the first service threshold and the second service threshold are respectively 7 and 4. The domain name system server may perform selection in the following manners: If the terminal reputation value 7 of the terminal a is greater than the first user threshold 6, and the first virtual IP address set determined from the VIP 1 to the VIP 4 includes the VIP 3 and the VIP 4 (that is, the IP reputation values of the VIP 3 and the VIP 4 are greater than or equal to the first service threshold 7), the VIP 4 is selected for the terminal a from the VIP 3 and the VIP 4. If the terminal reputation value 2 of the terminal b is less than the second user threshold 3, and the second virtual IP address set determined from the VIP 1 to the VIP 4 includes the VIP 1 (the IP reputation value 3 of the VIP 1 is less than the second service threshold 4), the VIP 1 is selected for the terminal b.

It should be noted that the first user threshold and the second user threshold may be preset thresholds of the terminal reputation value; the first user threshold is greater than or equal to the second user threshold; and the first user threshold and the second user threshold may be nonnegative numbers. For example, the first user threshold may be 6, and the second user threshold may be 3. The first service threshold and the second service threshold may also be preset thresholds of the IP reputation value. The first service threshold is greater than or equal to the second service threshold. The first service threshold and the second service threshold may also be nonnegative numbers. For example, the first service threshold may be 7, and the second service threshold may be 4.

In addition, the first virtual IP address set may include at least one virtual IP address; the second virtual IP address set may also include at least one virtual IP address; and the first virtual IP address set and the second virtual IP address set may be virtual IP address sets that are separately determined from the IP address resource pool based on the first service threshold and the second service threshold in advance.

When the determined first virtual IP address set includes only one virtual IP address, the domain name system server may directly use the virtual IP address as the selected virtual IP address. When the determined first virtual IP address set includes a plurality of virtual IP addresses, the domain name system server selects a virtual IP address from the first virtual IP address set. The selected IP address may be any virtual IP address in the first virtual IP address set, or a virtual IP address with a largest IP reputation value, or a virtual IP address with a smallest IP reputation value, or the like. This is not limited in this embodiment of this application.

It should be noted that a manner in which the domain name system server selects a virtual IP address from the second virtual IP address set is similar to the manner in which the domain name system server selects a virtual IP address from the first virtual IP address set. For details, refer to the foregoing descriptions. Details are not described again in this embodiment of this application.

S304: The domain name system server sends a domain name resolution response to the terminal, where the domain name resolution response carries the selected virtual IP address.

S305: The terminal receives the domain name resolution response sent by the domain name system server, where the domain name resolution response is consistent with that in S304.

The domain name system server may add the selected virtual IP address to the domain name resolution response and send the domain name resolution response to the terminal. When the terminal receives the domain name resolution response, the terminal may use the virtual IP address carried in the domain name resolution response to access the service. In one embodiment, the terminal may use an IP address of the terminal as a source address and the virtual IP address as a destination address, and send a packet to a network security device corresponding to the virtual IP address. After determining that the packet has no threat, the network security device may redirect the packet to the service server, to provide the service for the terminal.

For example, if the terminal is the terminal a in the foregoing example, and the virtual IP address carried in the domain name resolution response received by the terminal a is the VIP 4, the terminal a may use the VIP 4 to access the service. In one embodiment, the terminal a uses an IP address of the terminal a as the source address and the VIP 4 as the destination address, and sends a packet to a network security device corresponding to the VIP 4, so that after determining that the packet has no threat, the network security device redirects the packet to the service server, to provide the service for the terminal a.

In this embodiment of this application, the domain name system server selects the virtual IP address for the terminal based on the terminal reputation value of the terminal and the IP reputation value of each virtual IP address in the IP address resource pool, so that the terminal enjoys a network service by accessing the selected virtual IP address. In this way, when a hacker attack occurs, access traffic of a legitimate user is not switched, to ensure that the legitimate user can normally use a service of a tenant and service quality is not affected. In addition, the domain name system server may select virtual IP addresses with different security levels for terminals with different security levels, to ensure that a terminal with a higher security level can enjoy a higher-quality service. This enhances user experience.

Figure 4:
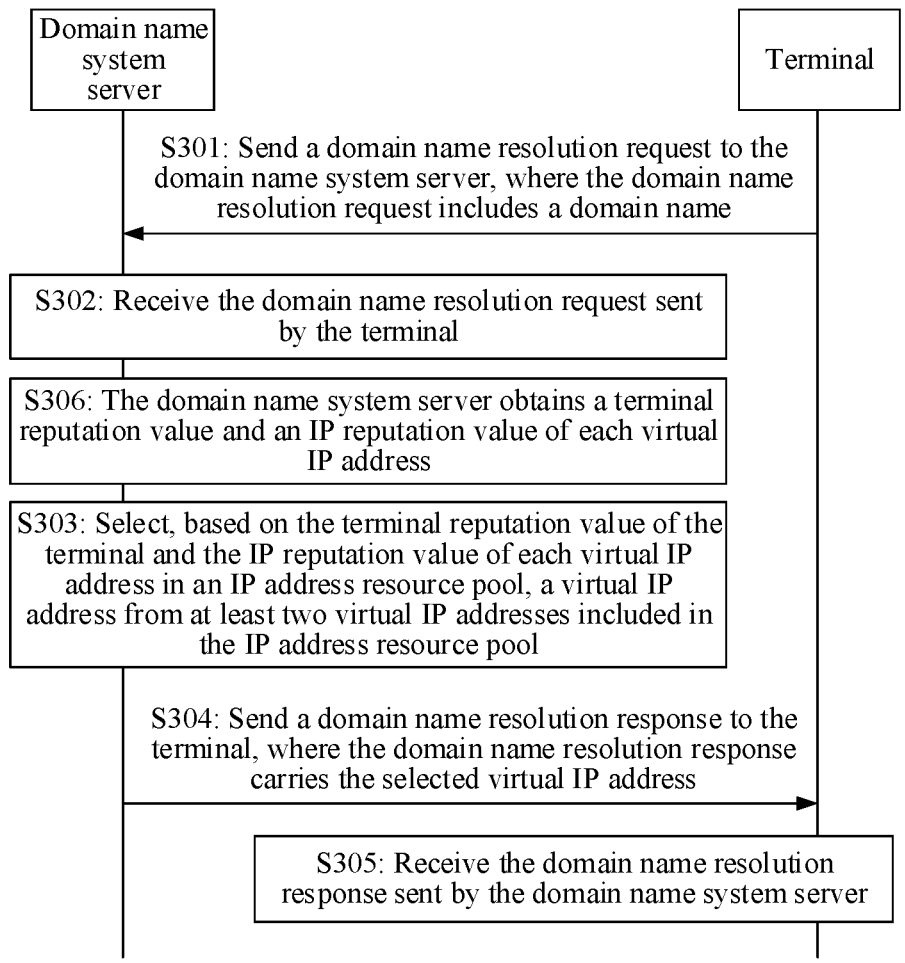
FIG. 4 is a schematic flowchart of another service resource scheduling method according to an embodiment of this application.

Further, with reference to FIG. 3, as shown in FIG. 4, before operation S303, the method may further include S306.

S306: The domain name system server obtains the terminal reputation value and the IP reputation value of each virtual IP address.

First, the domain name system server may obtain the terminal reputation value in the following manners: The domain name system server receives the terminal reputation value sent by the terminal. Alternatively, the domain name system server receives a terminal device parameter sent by the terminal, and determines the terminal reputation value based on the terminal device parameter. The two manners are described respectively hereunder.

(a): When the terminal reputation value is sent by the terminal to the domain name system server, the terminal may add the terminal reputation value in the domain name resolution request in S301, and send the terminal reputation value to the domain name system server by using the domain name resolution request. This can reduce power consumption of determining the terminal reputation value by the domain name system server, and can also reduce a quantity of signaling interactions between the terminal and the domain name system server. Certainly, in actual application, the terminal may alternatively send the terminal reputation value to the domain name system server by using other signaling. This is not limited in this embodiment of this application.

Correspondingly, before the terminal sends the domain name resolution request to the domain name system server, the terminal may detect a device parameter of the terminal, to obtain the terminal device parameter, and determine the terminal reputation value based on the terminal device parameter.

In one embodiment, the terminal device parameter may include at least one hardware fingerprint, and determining the terminal reputation value based on the terminal device parameter includes: querying a preset reputation score corresponding to each hardware fingerprint of the at least one hardware fingerprint, and determining the terminal reputation value based on the preset reputation score corresponding to each hardware fingerprint. The at least one hardware fingerprint includes one or more of the following: a global positioning system (GPS) fingerprint, a Bluetooth fingerprint, a battery fingerprint, a camera fingerprint, a wireless fidelity (Wi-Fi) module fingerprint, a temperature sensor fingerprint, and a microphone module fingerprint. That the terminal device parameter includes a hardware fingerprint may mean that the terminal includes hardware corresponding to the hardware fingerprint. If the terminal does not include a temperature sensor, the terminal device parameter does not include the temperature sensor fingerprint. For example, if the terminal includes only a Bluetooth module and a battery, the terminal device parameter includes the Bluetooth fingerprint and the battery fingerprint.

For example, the preset reputation score may be assigned to each hardware fingerprint in advance, and preset reputation scores corresponding to the hardware fingerprints may be the same, or may be different. When the terminal device parameter includes the at least one hardware fingerprint, the terminal may query the preset reputation score corresponding to each hardware fingerprint of the at least one hardware fingerprint, sum up the preset reputation scores corresponding to the hardware fingerprints (which is subsequently referred to as a sum of hardware reputation scores), and determine the sum of hardware reputation scores as the terminal reputation value. For example, the at least one hardware fingerprint includes the GPS fingerprint, the Bluetooth fingerprint, the battery fingerprint, and the camera fingerprint, and corresponding preset reputation scores are all 0.6. In this case, a sum of hardware reputation scores which is 2.4 is obtained. Therefore, the terminal reputation value is 2.4. The battery fingerprint refers to information such as a battery type, charging, discharging, and power consumption that is obtained by a processor of a terminal device when a battery is a hardware component of the terminal device. In one embodiment, the processor obtains the information by using a power management system.

In one embodiment, the terminal device parameter may further include at least one software fingerprint, and the determining the terminal reputation value based on the terminal device parameter further includes: querying a preset reputation score corresponding to each software fingerprint of the at least one software fingerprint, and determining the terminal reputation value based on the preset reputation score corresponding to each software fingerprint. The at least one software fingerprint includes one or more of the following: an international mobile equipment identity (IMEI), a universally unique identifier (UUID), a network type, a terminal type, an operating system type, a network mode, a battery temperature, a power feature, an SIM card serial number, and a mobile phone number. The battery temperature and a remaining power feature are obtained by using an interface provided by an operating system of the terminal device.

The network type may be Wi-Fi, 3G, 4G, or the like. The terminal type may refer to a type of a manufacturer (for example, company A or company B) that produces the terminal, or may be a type of an emulator, or the like. The operating system type may be an Android (android) system, an iOS system, or the like. The network mode may be China Telecom, China Mobile, or China Unicom. The battery temperature may be zero or non-zero, a particular temperature, or the like. The power feature may be a power change feature, for example, 50% of non-persistent power. The IMEI, the UUID, the SIM card serial number, and the mobile phone number may be numerical sequences, or identifiers indicating whether the IMEI, the UUID, the SIM card serial number, and the mobile phone number exist.

For example, the preset reputation score may be assigned to each software fingerprint in advance, and preset reputation scores corresponding to the software fingerprints may be the same, or may be different. When the terminal device parameter further includes the at least one software fingerprint, the terminal may query the preset reputation score corresponding to each software fingerprint of the at least one software fingerprint, sum up the preset reputation scores corresponding to the software fingerprints (which is subsequently referred to as a sum of software reputation scores), and determine that a sum of hardware reputation scores and software reputation scores is the terminal reputation value. For example, the sum of hardware reputation scores is 2.4. The at least one software fingerprint includes the IMEI, the UUID, the network type being 3G, and the network mode being China Mobile, and corresponding preset reputation scores are all 0.3. In this case, a sum of software reputation scores which is 1.2 is obtained. Therefore, the terminal reputation value is 3.6.

In one embodiment, the terminal device parameter may further include at least one piece of malicious information, and the determining the terminal reputation value based on the terminal device parameter further includes: querying a preset reputation score corresponding to each piece of malicious information of the at least one piece of malicious information, and determining the terminal reputation value based on the preset reputation score corresponding to each piece of malicious information. The at least one piece of malicious information includes one or more of the following: CPU malicious information, malicious information corresponding to a file stored in a memory, application programming interface demonstration (API DEMOS) malicious information, developer tools (DevTools) malicious information, application permission malicious information, abnormal port information, and abnormal process information.

The API DEMOS herein is a description document used to describe an API, for example, a description document used to describe a type and a usage method of the API. When the API is installed or used, a related description document is configured for the API. A DevTools is an open debugging tool that is usually hidden in an Android emulator, and provides powerful debugging support for a developer, to help the developer analyze performance of current software.

That the at least one piece of malicious information includes a piece of malicious information may mean that a detection result corresponding to the malicious information is non-existent or secure. In one embodiment, a corresponding malicious file is not detected or an inherent file is detected. That the at least one piece of malicious information does not include a piece of malicious information may mean that a detection result corresponding to the malicious information is existent or insecure. In one embodiment, a corresponding malicious file is detected or a detection file of the malicious information does not exist.

For example, the CPU malicious information may be used to indicate that a CPU does not detect a goldfish malicious file or detects an Intel file or an AMD file. The file stored in the memory may include one or more of an album, an SMS message, a communication record, a malicious log, a temperature file, and the like. The malicious information corresponding to the file stored in the memory may be used to indicate that no malicious information is detected in the file. The API DEMOS malicious information is used to indicate that an application programming interface indicated by an API DEMOS document detects no malicious information. DevTools malicious information is used to indicate that a tool indicated by the DevTools detects no malicious information. The application permission malicious information may be used to indicate that a permission affecting application or terminal security is not granted. The abnormal port information may be used to indicate that no abnormal port is detected. The abnormal process information may be used to indicate that no abnormal process is detected.

It should be noted that a manner of determining the terminal reputation value based on the preset reputation score corresponding to each piece of malicious information is similar to the manner of determining the terminal reputation value based on the preset reputation score corresponding to each software fingerprint. For details, refer to the foregoing descriptions. Details are not described again in this embodiment of this application.

In one embodiment, the terminal device parameter further includes transmission traffic and a quantity of connections, and the determining the terminal reputation value based on the terminal device parameter further includes: updating the terminal reputation value when the quantity of connections and/or the transmission traffic are/is abnormal. In one embodiment, when the quantity of connections and/or the transmission traffic are/is abnormal, the terminal may update, based on a preset reputation score corresponding to the quantity of connections and/or the transmission traffic, the terminal reputation value determined in the foregoing manner. When the quantity of connections and/or the transmission traffic are/is normal, the terminal may update the terminal reputation value, and record only the quantity of connections and/or the transmission traffic.

For example, preset reputation scores corresponding to the quantity of connections and the transmission traffic are both 1. When the quantity of connections is abnormal and the transmission traffic is normal, the terminal may subtract 1 from the terminal reputation value determined by using the at least one hardware fingerprint, the at least one software fingerprint, or the at least one piece of malicious information, to update the terminal reputation value.

For example, the terminal may determine, in the following manners, whether the quantity of connections and/or the transmission traffic are/is in abnormal: When the quantity of connections or an increment of the quantity of connections is greater than or equal to a preset respective quantity threshold, it may be determined that the quantity of connections is abnormal. When the transmission traffic or an increment of the transmission traffic is greater than or equal to a preset respective traffic threshold, it may be determined that the transmission traffic is abnormal.

It should be noted that the terminal may obtain the terminal device parameter by using a software development kit (SDK) on the terminal. For example, the hardware fingerprint, the software fingerprint, and the malicious information are detected by using the SDK.

(b): The domain name system server receives the terminal device parameter sent by the terminal, and determines the terminal reputation value based on the terminal device parameter.

The terminal may add the terminal device parameter to the domain name resolution request in S301, and send the terminal device parameter to the domain name system server by using the domain name resolution request, so that a quantity of signaling interactions between the terminal and the domain name system server may be reduced. Certainly, in actual application, the terminal may alternatively send the terminal device parameter to the domain name system server by using other signaling. This is not limited in this embodiment of this application.

It should be noted that a process in which the domain name system server determines the terminal reputation value based on the terminal device parameter is similar to a process in which the terminal determines the terminal reputation value based on the terminal device parameter in (a). For details, refer to the foregoing descriptions. Details are not described again in this embodiment of this application.

Second, the domain name system server may obtain the IP reputation value of each virtual IP address in the following manner: The domain name system server receives attack information sent by one of the at least one network security device, where the attack information includes an attacked IP address; and determines the IP reputation value of each virtual IP address based on the attacked IP address.

When one of the at least one network security device detects the attack information, the network security device that detects the attack information may send the attack information to the domain name system server, so that the domain name system server may receive the attack information. The attack information includes the attacked IP address. If the attacked IP address is a virtual IP address of the at least one network security device, that is, the attacked IP address is a virtual IP address in the IP address resource pool, the domain name system server may determine the IP reputation value of each virtual IP address based on the attacked IP address.

For example, the domain name system server may collect statistics on a quantity of attacks corresponding to the attacked IP address, and determine the IP reputation value of each virtual IP address based on the quantity of attacks. A virtual IP address with a larger quantity of attacks has a smaller IP reputation value. A virtual IP address with a smaller quantity of attacks has a larger IP reputation value.

In one embodiment, the attack information may further include information such as an IP address of an attack source, attack initiation time, attack duration, and attack traffic volume. Correspondingly, the domain name system server may determine, based on the attack information, information such as an attack interval (namely, an interval between two consecutive attacks) and an attack frequency (namely, a quantity of attacks per unit time) corresponding to the attacked IP address, and a terminal access increment of the attacked IP address (namely, a difference between terminal access traffic corresponding to the attacked IP address in the two consecutive attacks). The IP reputation value of each virtual IP address is determined based on one or more pieces of the information. A virtual IP address with a shorter attack interval, a higher attack frequency, more attack traffic (for example, the attack traffic exceeds a traffic threshold), and a larger terminal access increment has a smaller IP reputation value. A virtual IP address with a longer attack interval, a lower attack frequency, less attack traffic, and a smaller terminal access increment has a larger IP reputation value.

Further, when the attack information further includes the IP address of the attack source, if the IP address of the attack source is an IP address of the terminal, the domain name system server may further update the terminal reputation value.

For example, if the IP address of the attack source is the IP address of the terminal, and the IP address of the attack source belongs to a blacklist, the terminal reputation value may be updated to a preset minimum reputation value. For example, a minimum reputation value is 2, and the terminal reputation value may be updated to 2. Alternatively, the domain name system server may further determine information such as an attack interval, an attack frequency, and attack traffic volume corresponding to the IP address of the attack source, and update the terminal reputation value based on one or more pieces of the information. When the attack interval is shorter, the attack frequency is higher, and the attack traffic is more, the terminal reputation value may be decreased. When the attack interval is longer, the attack frequency is lower, and the attack traffic is less, the terminal reputation value may be increased.

Further, the terminal or the domain name system server may determine terminal status information of the terminal. The terminal may determine the terminal status information based on the terminal device parameter, and send the terminal status information to the domain name system server. In one embodiment, the terminal status information is carried in the domain name resolution request, or the terminal sends the terminal status information to the domain name system server by using other signaling. Alternatively, the domain name system server determines the terminal status information based on the terminal device parameter sent by the terminal.

Correspondingly, when the terminal status information is abnormal, the domain name system server may select a virtual IP address with a lowest or a lower IP reputation value from the IP address resource pool, and then send the virtual IP address to the terminal by using operation S305.

For example, a process in which the terminal or the domain name system server determines the terminal status information based on the terminal device parameter may be as follows: If the sum of hardware reputation scores determined based on the terminal device parameter is less than a third user threshold, or if the sum of hardware reputation scores and software reputation scores that are determined based on the terminal device parameter is less than a fourth user threshold, it may be determined that the terminal is in an abnormal state. The third user threshold is less than or equal to the fourth user threshold. Alternatively, if the terminal device parameter does not include the battery fingerprint, or the power feature is that the power does not change, or the terminal type is a specified type such as the type of the emulator, it may be determined that the terminal status information is abnormal.

In this embodiment of this application, the domain name system server may ensure validity of the terminal reputation value and the IP reputation value of each virtual IP address by obtaining or updating the terminal reputation value and the IP reputation value of each virtual IP address. In this way, it is ensured that an appropriate virtual IP address is selected from the IP address resource pool based on the terminal reputation value and the IP reputation value of each virtual IP address. Therefore, accuracy of virtual IP address selection is improved. In other words, different network security devices are selected to provide security assurance for different terminals to access a same network service. In this way, when a hacker attack occurs, only traffic of a few terminals is scheduled to another network security device, and access traffic of most legitimate users is not switched, so that most legitimate users can normally use a tenant service, and service quality is not affected.

The solutions provided in the embodiments of this application are mainly described from a perspective of interaction between network elements. It may be understood that, to implement the foregoing functions, each network element, for example the domain name system server, or the terminal, includes a corresponding hardware structure and/or software module for performing the functions. A person of ordinary skill in the art should easily be aware that, in combination with units and algorithms operations of the examples described in the embodiments disclosed in this specification, this application may be implemented by hardware, software, or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In the embodiments of this application, function module division may be performed on the domain name system server and the terminal based on the foregoing method embodiments. For example, each function module may be divided based on each function, or two or more functions may be integrated in one processing module. The integrated module may be implemented in a form of hardware, or may be implemented in a form of a software function module. It should be noted that, in the embodiments of this application, division into the modules is used as an example, and is merely logical function division. In an actual implementation, another division manner may be used. An example in which function modules are divided based on functions is used hereinafter for description.

Figure 5:
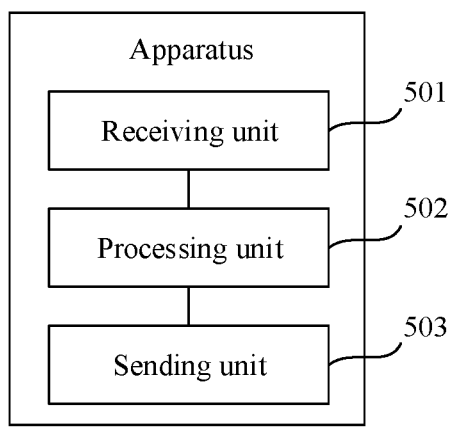
FIG. 5 is a schematic structural diagram 1 of an apparatus according to an embodiment of this application.

FIG. 5 is a schematic structural diagram of an apparatus in the foregoing embodiments. The apparatus may implement a function of the domain name system server in the methods provided in the embodiments of this application. The apparatus may be a domain name system server or an apparatus that may support the domain name system server in implementing the function of the domain name system server in the embodiments of this application. For example, the apparatus is a chip system applied to the domain name system server. The apparatus includes a receiving unit 501, a processing unit 502, and a sending unit 503. The receiving unit 501 may be configured to support the apparatus shown in FIG. 5 in performing operation S302 in the method embodiments. The processing unit 502 may be configured to support the apparatus shown in FIG. 5 in performing operation S303 in the method embodiments. The sending unit 503 is configured to support the apparatus shown in FIG. 5 in performing operation S304 in the method embodiments. All related content of the operations in the method embodiments may be cited in function descriptions of the corresponding function modules. Details are not described herein again.

In this embodiment of this application, the chip system may include a chip, or may include a chip and another discrete component.

In one embodiment, the receiving unit 501 and the sending unit 503 in this embodiment of this application may be a circuit, a component, an interface, a bus, a software module, a transceiver, or any other apparatus that may implement communication.

In one embodiment, the receiving unit 501 and the sending unit 503 may be a domain name system server or a communications interface of the chip system applied to the domain name system server. For example, the communications interface may be a transceiver circuit. The processing unit 502 may be integrated on the domain name system server or a processor of the chip system applied to the domain name system server.

Figure 6:
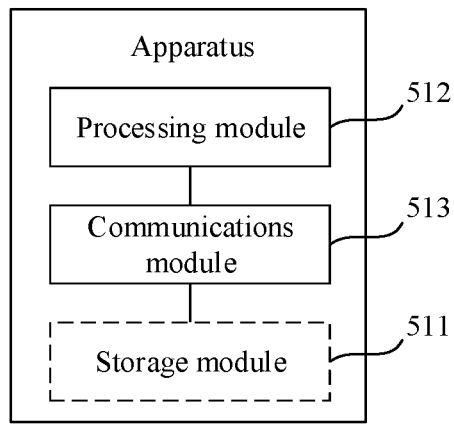
FIG. 6 is a schematic structural diagram 2 of an apparatus according to an embodiment of this application.

FIG. 6 is a schematic diagram of a possible logical structure of an apparatus in the foregoing embodiments. The apparatus may implement the function of the domain name system server in the methods provided in the embodiments of this application. The apparatus may be a domain name system server or a chip system applied to the domain name system server. The apparatus includes a processing module 512 and a communications module 513. The processing module 512 is configured to control and manage an action of the apparatus shown in FIG. 6. For example, the processing module 512 is configured to perform an operation of message or data processing performed by the apparatus shown in FIG. 6. For example, the processing unit 512 supports the apparatus shown in FIG. 6 in performing operation S303 in the method embodiments, and/or is configured for another process of the technology described in this specification. The communications module 513 is configured to support the apparatus shown in FIG. 6 in performing S302 and S304 in the method embodiments. In one embodiment, the apparatus shown in FIG. 6 may further include a storage module 511, configured to store program code and data of the apparatus.

The processing module 512 may be a processor or a controller. For example, the processing module 512 may be a central processing unit, a general-purpose processor, a digital signal processor, an application-specific integrated circuit, a field programmable gate array or another programmable logical device, a transistor logical device, a hardware component, or any combination thereof The processing module 512 may implement or execute various example logical blocks, modules, and circuits described with reference to content disclosed in the embodiments of this application. Alternatively, the processor may be a combination implementing a computing function, for example, a combination of one or more microprocessors, or a combination of a digital signal processor and a microprocessor. The communications module 513 may be a transceiver, a transceiver circuit, a communications interface, or the like. The storage module 511 may be a memory.

Figure 7:
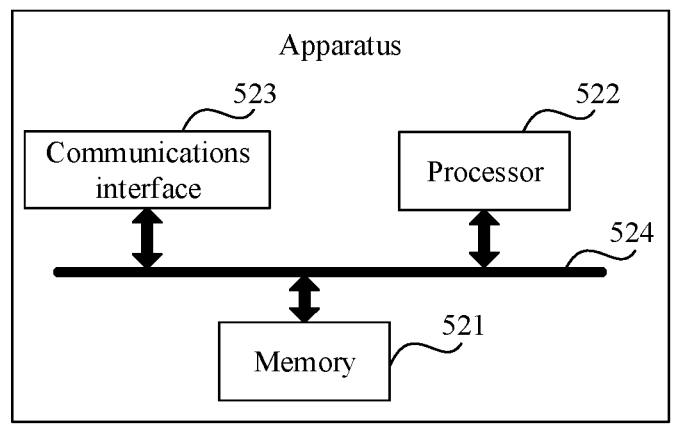
FIG. 7 is a schematic structural diagram 3 of an apparatus according to an embodiment of this application.

When the processing module 512 is a processor 522; the communications module 513 is a communications interface 523 or a transceiver; and the storage module 511 is a memory 521; the apparatus in this embodiment of this application may be an apparatus shown in FIG. 7.

The communications interface 523, the processor 522, and the memory 521 are connected to each other by using a bus 524. The bus 524 may be a PCI bus, an EISA bus, or the like. The bus may be classified into an address bus, a data bus, a control bus, and the like. For ease of representation, only one thick line is used to represent the bus in FIG. 7, but this does not mean that there is only one bus or only one type of bus. The memory 521 is configured to store program code and data of the apparatus. The communications interface 523 is configured to support the apparatus in communicating with another device. The processor 522 is configured to support the apparatus in executing the program code stored in the memory 521, to implement the operations in the methods provided in the embodiments of this application.

In one embodiment, the memory 521 may be included in the processor 522.

Figure 8:
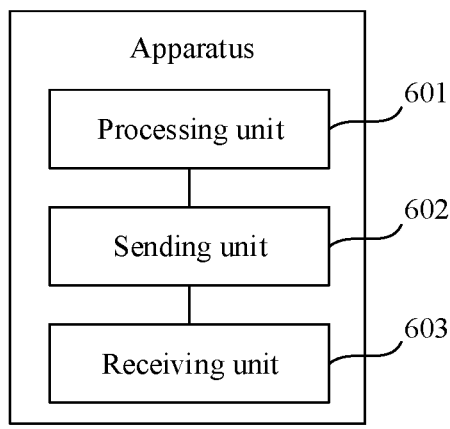
FIG. 8 is a schematic structural diagram 4 of an apparatus according to an embodiment of this application.

FIG. 8 is a schematic structural diagram of an apparatus in the foregoing embodiments. The apparatus may implement a function of the terminal in the methods provided in the embodiments of this application. The apparatus may be a terminal or an apparatus that may support the terminal in implementing a function of the terminal in the embodiments of this application. For example, the apparatus is a chip system applied to the terminal. The apparatus includes a processing unit 601, a sending unit 602, and a receiving unit 603. The processing unit 601 may be configured to support the apparatus shown in FIG. 8 in performing the operation of determining the terminal reputation value of the terminal in the method embodiments. The sending unit 602 may be configured to support the apparatus shown in FIG. 8 in performing operation S301 in the method embodiments. The receiving unit 603 is configured to support the apparatus shown in FIG. 8 in performing operation S305 in the method embodiments. All related content of the operations in the method embodiments may be cited in function descriptions of the corresponding function modules. Details are not described herein again.

In one embodiment, an application program may run in the processing unit 601. A software development kit (SDK) is integrated into the application program. The application program in the processing unit 601 may obtain a terminal device parameter based on the SDK. In other words, the SDK may directly detect and obtain at least one hardware fingerprint, at least one software fingerprint, at least one piece of malicious information, and the like. Then, the application program may determine the terminal reputation value of the terminal based on the terminal device parameter obtained by the SDK.

In this embodiment of this application, the chip system may include a chip, or may include a chip and another discrete component.

In one embodiment, the sending unit 602 and the receiving unit 603 in this embodiment of this application may be a circuit, a component, an interface, a bus, a software module, a transceiver, or any other apparatus that may implement communication.

In one embodiment, the sending unit 602 and the receiving unit 603 may be a terminal or a communications interface of the chip system applied to the terminal. For example, the communications interface may be a transceiver circuit. The processing unit 601 may be integrated on the terminal or a processor of the chip system applied to the terminal.

Figure 9:
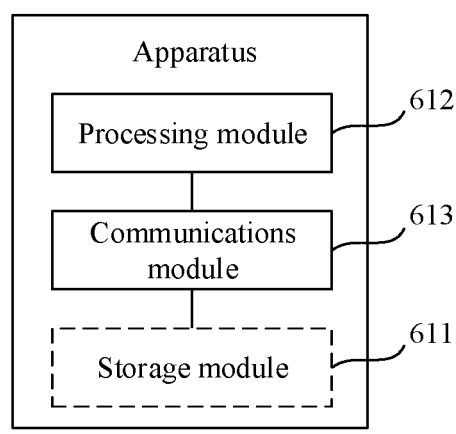
FIG. 9 is a schematic structural diagram 5 of an apparatus according to an embodiment of this application.

FIG. 9 is a schematic diagram of a possible logical structure of an apparatus in the foregoing embodiments. The apparatus may implement a function of the terminal in the methods provided in the embodiments of this application. The apparatus may be a terminal or a chip system applied to the terminal. The apparatus includes a processing module 612 and a communications module 613. The processing module 612 is configured to control and manage an action of the apparatus shown in FIG. 9. For example, the processing module 612 is configured to perform a operation of message or data processing performed by the apparatus shown in FIG. 9. For example, the processing module 612 supports the apparatus shown in FIG. 9 in performing the operation of determining the terminal reputation value of the terminal in the method embodiments, and/or is configured for another process of the technology described in this specification. A process of determining the terminal reputation value of the terminal may be consistent with the process executed by the processing unit 601. The communications module 613 is configured to support the apparatus shown in FIG. 9 in performing S301 and S305 in the method embodiments. In one embodiment, the apparatus shown in FIG. 9 may further include a storage module 611, configured to store program code and data of the apparatus.

The processing module 612 may be a processor or a controller. For example, the processing module 612 may be a central processing unit, a general-purpose processor, a digital signal processor, an application-specific integrated circuit, a field programmable gate array or another programmable logic device, a transistor logic device, a hardware component, or any combination thereof The processing unit 612 may implement or execute various example logical blocks, modules, and circuits described with reference to content disclosed in the embodiments of this application. Alternatively, the processor may be a combination implementing a computing function, for example, a combination of one or more microprocessors, or a combination of a digital signal processor and a microprocessor. The communications module 613 may be a transceiver, a transceiver circuit, a communications interface, or the like. The storage module 611 may be a memory.

Figure 10:
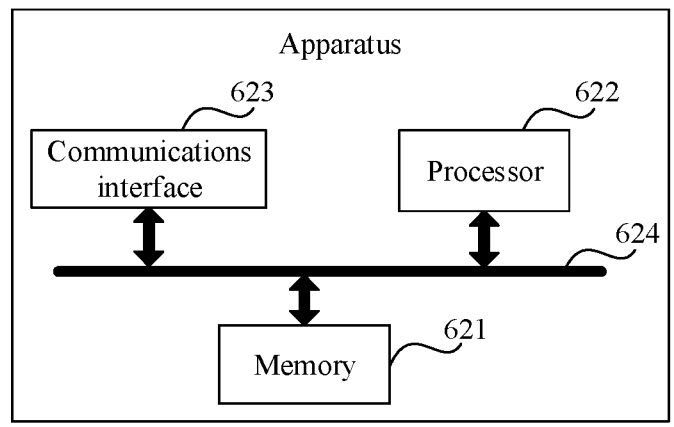
FIG. 10 is a schematic structural diagram 6 of an apparatus according to an embodiment of this application.

When the processing module 612 is a processor 622; the communications module 613 is a communications interface 623 or a transceiver; and the storage module 611 is a memory 621; the apparatus in this embodiment of this application may be an apparatus shown in FIG. 10.

The communications interface 623, the processor 622, and the memory 621 are connected to each other by using a bus 624. The bus 624 may be a PCI bus, an EISA bus, or the like. The bus may be classified into an address bus, a data bus, a control bus, and the like. For ease of representation, only one thick line is used to represent the bus in FIG. 10, but this does not mean that there is only one bus or only one type of bus. The memory 621 is configured to store program code and data of the apparatus. The communications interface 623 is configured to support the apparatus in communicating with another device. The processor 622 is configured to support the apparatus in executing the program code stored in the memory 621, to implement the operations in the methods provided in the embodiments of this application.

In one embodiment, the memory 621 may be included in the processor 622.

An embodiment of this application further provides a system. The system includes a terminal, a service server, a domain name system server, and at least one network security device. The domain name system server may be the apparatus provided in any one of FIG. 5 to FIG. 7, and is configured to perform the operations of the domain name server in the method embodiments; and/or the terminal is the apparatus provided in any one of FIG. 8 to FIG. 10, and is configured to perform the operations of the terminal in the method embodiments.

All or some of the methods in the embodiments of this application may be implemented by using software, hardware, firmware, or any combination thereof When the software is used to implement the embodiments, all or some of the embodiments may be implemented in a form of a computer program product. The computer program product includes one or more computer instructions. When the computer program instructions are loaded and executed on a computer, all or some of the procedures or functions described in the embodiments of this application are generated. The computer may be a general-purpose computer, a dedicated computer, a computer network, a network device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (such as a floppy disk, a hard disk, or a magnetic tape), an optical medium (such as a digital video disc (DVD)), a semiconductor medium (such as an SSD), or the like.

Based on such understanding, an embodiment of this application further provides a computer-readable storage medium. The computer-readable storage medium stores an instruction. When the instruction is run on a computer, the computer is enabled to perform one or more operations of the domain name system server in the method embodiments.

An embodiment of this application further provides a computer-readable storage medium. The computer-readable storage medium stores an instruction. When the instruction is run on a computer, the computer is enabled to perform one or more operations of the terminal in the method embodiments.

An embodiment of this application further provides a computer program product including an instruction. When the computer program product runs on a computer, the computer is enabled to perform one or more operations of the domain name system server in the method embodiments.

An embodiment of this application further provides a computer program product including an instruction. When the computer program product runs on a computer, the computer is enabled to perform one or more operations of the terminal in the method embodiments.

A person of ordinary skill in the art may be aware that units and algorithm operations in the examples described with reference to the embodiments disclosed in this specification may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the embodiment goes beyond the scope of this application.

It may be clearly understood by a person skilled in the art that, for convenience and brevity of description, for a working process of the foregoing system, apparatus, and units, refer to a corresponding process in the method embodiments. Details are not described herein again.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A service resource scheduling method applied to a network comprising: a terminal, a service server, a domain name system server, and at least one network security device; wherein, each of the at least one network security devices has a virtual IP address, a domain name of a service provided by the service server is mapped to an IP address resource pool on the domain name system server, wherein each of the at least one network security devices is configured to provide security protection for the service server, and when one network security device in the at least one network security device is faulty or attacked, traffic of the terminal on the attacked network security device is switched to another network security device in the at least one network security device, and the IP address resource pool comprises at least two of the virtual IP addresses, and the method comprises:

receiving, by the domain name system server, a domain name resolution request sent by a first terminal, wherein the domain name resolution request comprises the domain name;

selecting, based on a terminal reputation value of the first terminal and an IP reputation value of each virtual IP address in the IP address resource pool, a virtual IP address from the at least two virtual IP addresses comprised in the IP address resource pool, wherein a terminal reputation value of a terminal is used to indicate a security level of the terminal, and an IP reputation value of a virtual IP address is used to indicate a security level of the virtual IP address, wherein a virtual IP address for a network security device providing higher-quality service with a higher security level is selected by the domain name system server for a terminal with a higher security level;

sending a domain name resolution response to the first terminal, wherein the domain name resolution response carries the selected virtual IP address for the network security device;

receiving, by the domain name system server, a domain name resolution request sent by a second terminal, wherein the domain name resolution request sent by the second terminal comprises the domain name, wherein, if a terminal reputation value of the second terminal is less than a second user threshold, determining a second virtual IP address set from the IP address resource pool, wherein an IP reputation value of each virtual IP address in the second virtual IP address set is less than a second service threshold, a first user threshold is greater than or equal to the second user threshold, and a first service threshold is greater than or equal to the second service threshold;

selecting a virtual IP address from the second virtual IP address set; and sending a domain name resolution response to the second terminal, wherein the domain name resolution response carries the virtual IP address selected from the second virtual IP address set.

2. The service resource scheduling method according to claim 1, wherein the selecting, based on a terminal reputation value of the first terminal and an IP reputation value of each virtual IP address in the IP address resource pool, a virtual IP address from the at least two virtual IP addresses comprised in the IP address resource pool, comprises:

if the terminal reputation value of the first terminal is greater than or equal to a first user threshold, determining a first virtual IP address set from the IP address resource pool, wherein an IP reputation value of each virtual IP address in the first virtual IP address set is greater than or equal to a first service threshold; and selecting a virtual IP address from the first virtual IP address set.

3. The service resource scheduling method according to claim 1, wherein the obtaining the terminal reputation value of the first terminal comprises: receiving the terminal reputation value of the first terminal sent by the first terminal.

4. The service resource scheduling method according to claim 3, wherein the terminal reputation value of the first terminal is carried in the domain name resolution request sent by the first terminal.

5. The service resource scheduling method according to claim 1, wherein the obtaining the terminal reputation value of the first terminal comprises:

receiving a terminal device parameter sent by the first terminal; and determining the terminal reputation value of the first terminal based on the terminal device parameter.

6. The service resource scheduling method according to claim 5, wherein the terminal device parameter of the first terminal is carried in the domain name resolution request sent by the first terminal.

7. The service resource scheduling method according to claim 5, wherein the terminal device parameter comprises at least one hardware fingerprint, and the determining the terminal reputation value of the first terminal based on the terminal device parameter comprises:

querying a preset reputation score corresponding to each hardware fingerprint of the at least one hardware fingerprint, and determining the terminal reputation value of the first terminal based on the preset reputation score corresponding to each hardware fingerprint, wherein the at least one hardware fingerprint includes one or more of the following: a GPS fingerprint, a Bluetooth fingerprint, a battery fingerprint, a camera fingerprint, a Wi-Fi module fingerprint, a temperature sensor fingerprint, and a microphone module fingerprint.

8. The service resource scheduling method according to claim 5, wherein the terminal device parameter comprises at least one software fingerprint, and the determining the terminal reputation value of the first terminal based on the terminal device parameter further comprises:

querying a preset reputation score corresponding to each software fingerprint of the at least one software fingerprint, and determining the terminal reputation value of the first terminal based on the preset reputation score corresponding to each software fingerprint, wherein the at least one software fingerprint includes one or more of the following: an international mobile equipment identity (IMEI), a universally unique identifier (UUID), a network type, a terminal type, an operating system type, a network mode, a battery temperature, a power feature, a SIM card serial number, and a mobile phone number.

9. The service resource scheduling method according to claim 5, wherein the terminal device parameter comprises at least one piece of malicious information, and the determining the terminal reputation value of the first terminal based on the terminal device parameter further comprises:

querying a preset reputation score corresponding to each piece of malicious information of the at least one piece of malicious information, and determining the terminal reputation value of the first terminal based on the preset reputation score corresponding to each piece of malicious information, wherein the at least one piece of malicious information includes one or more of the following:

CPU malicious information, malicious information corresponding to a file stored in a memory, API DEMOS malicious information, DevTools malicious information, application permission malicious information, abnormal port information, and abnormal process information.

10. The service resource scheduling method according to claim 5, wherein the terminal device parameter comprises transmission traffic and a quantity of connections, and the determining the terminal reputation value of the first terminal based on the terminal device parameter further comprises:

updating the terminal reputation value of the first terminal when the quantity of connections and/or the transmission traffic are/is abnormal.

11. The service resource scheduling method according to claim 3, wherein the method further comprises:

receiving attack information sent by one of the at least one network security device, wherein the attack information comprises an attacked IP address; and determining the IP reputation value of each virtual IP address based on the attacked IP address.

12. The service resource scheduling method according to claim 1, wherein the attack information further comprises an IP address of an attack source and the method further comprises:

if the IP address of the attack source is an IP address of the first terminal, updating the terminal reputation value of the first terminal.

13. A domain name system server applied to a network comprising: a terminal, a service server, the domain name system server, and at least one network security device; wherein each of the at least one network security devices has a virtual IP address, a domain name of a service provided by the service server is mapped to an IP address resource pool on the domain name system server, wherein each of the at least one network security devices is configured to provide security protection for the service server, and when one network security device in the at least one network security device is faulty or attacked, traffic of the terminal on the attacked network security device is switched to another network security device in the at least one network security device, the IP address resource pool comprises at least two of the virtual IP addresses; and the domain name system server comprises:

a communications interface configured to receive a domain name resolution request sent by a first terminal, wherein the domain name resolution request comprises the domain name;

a memory comprising instructions; and one or more processors coupled with the memory, wherein the one or more processors execute the instructions to:

select, based on a terminal reputation value of the first terminal and an IP reputation value of each virtual IP address in the IP address resource pool, a virtual IP address from the at least two virtual IP addresses comprised in the IP address resource pool, wherein a terminal reputation value of a terminal is used to indicate a security level of the terminal, and an IP reputation value of a virtual IP address is used to indicate a security level of the virtual IP address, wherein a virtual IP address for a network security device providing higher-quality service with a higher security level is selected by the domain name system server for a terminal with a higher security level; and the communications interface is further configured to send a domain name resolution response to the first terminal, wherein the domain name resolution response carries the selected virtual IP address for the network security device;

receive a domain name resolution request sent by a second terminal, wherein the domain name resolution request sent by the second terminal comprises the domain name, wherein, if a terminal reputation value of the second terminal is less than a second user threshold, determining a second virtual IP address set from the IP address resource pool, wherein an IP reputation value of each virtual IP address in the second virtual IP address set is less than a second service threshold, a first user threshold is greater than or equal to the second user threshold, and a first service threshold is greater than or equal to the second service threshold;

select a virtual IP address from the second virtual IP address set; and the communications interface is further configured to send a domain name resolution response to the second terminal, wherein the domain name resolution response carries the virtual IP address selected from the second virtual IP address set.

14. The domain name system server according to claim 13, wherein the instructions when executed by the one or more processors further cause the domain name system server to:

if the terminal reputation value of the first terminal is greater than or equal to a first user threshold, determine a first virtual IP address set from the IP address resource pool, wherein an IP reputation value of each virtual IP address in the first virtual IP address set is greater than or equal to a first service threshold; and select a virtual IP address from the first virtual IP address set.

15. The domain name system server according to claim 13, wherein, the communications interface is further configured to receive the terminal reputation value of the first terminal sent by the first terminal, wherein the terminal reputation value of the first terminal is carried in the domain name resolution request sent by the first terminal.

16. The domain name system server according to claim 13, wherein, the communications interface is further configured to receive a terminal device parameter sent by the first terminal, wherein the terminal device parameter of the first terminal is carried in the domain name resolution request sent by the first terminal.

17. The domain name system server according to claim 16, wherein the terminal device parameter comprises at least one hardware fingerprint, and the instructions when executed by the one or more processors further cause the domain name system server to:

query a preset reputation score corresponding to each hardware fingerprint of the at least one hardware fingerprint, and determine the terminal reputation value of the first terminal based on the preset reputation score corresponding to each hardware fingerprint, wherein, the at least one hardware fingerprint includes one or more of the following: a GPS fingerprint, a Bluetooth fingerprint, a battery fingerprint, a camera fingerprint, a Wi-Fi module fingerprint, a temperature sensor fingerprint, and a microphone module fingerprint.

18. A terminal applied to a network comprising: the terminal, a service server, a domain name system server, and at least one network security device; wherein each of the at least one network security devices has a virtual IP address, a domain name of a service provided by the service server is mapped to an IP address resource pool on the domain name system server, wherein each of the at least one network security devices is configured to provide security protection for the service server, and when one network security device in the at least one network security device is faulty or attacked, traffic of the terminal on the attacked network security device is switched to another network security device in the at least one network security device, the IP address resource pool comprises at least two of the virtual IP addresses, and the terminal comprises:

a communications interface configured to:

send a domain name resolution request to the domain name system server, wherein the domain name resolution request comprises the domain name; and receive a domain name resolution response sent by the domain name system server, wherein the domain name resolution response carries a virtual IP address in the IP address resource pool, the virtual IP address carried in the domain name resolution response is selected by the domain name system server from the IP address resource pool based on a reputation value of the terminal and an IP reputation value of each virtual IP address in the IP address resource pool and the reputation value is used to indicate a security level of the terminal and is obtained according to a terminal device parameter of the terminal, an IP reputation value of a virtual IP address is used to indicate a security level of the virtual IP address, wherein a virtual IP address for a network security device providing higher-quality service with a higher security level is selected by the domain name system server for a terminal with a higher security level, receiving, by the domain name system server, a domain name resolution request sent by a second terminal, wherein the domain name resolution request sent by the second terminal comprises the domain name, wherein, if a terminal reputation value of the second terminal is less than a second user threshold, determining a second virtual IP address set from the IP address resource pool, wherein an IP reputation value of each virtual IP address in the second virtual IP address set is less than a second service threshold, a first user threshold is greater than or equal to the second user threshold, and a first service threshold is greater than or equal to the second service threshold;

selecting a virtual IP address from the second virtual IP address set; and sending a domain name resolution response to the second terminal, wherein the domain name resolution response carries the virtual IP address selected from the second virtual IP address set.

19. The terminal according to claim 18, wherein the terminal further comprises:

a memory comprising instructions; and one or more processors coupled with the memory, wherein the one or more processors execute the instructions to:

obtain the terminal device parameter; and the communications interface is further configured to send the terminal device parameter to the domain name system server; or the instructions when executed by the one or more processors further cause the domain name system server to determine the terminal reputation value based on the terminal device parameter; and the communications interface is further configured to send the terminal reputation value to the domain name system server.

* * * * *

UNITED STATES PATENT AND TRADEMARK OFFICE
CERTIFICATE OF CORRECTION

PATENT NO. : 11,671,402 B2
APPLICATION NO. : 17/119720
DATED : June 6, 2023
INVENTOR(S) : Zhaoqi Wang It is certified that error appears in the above-identified patent and that said Letters Patent is hereby corrected as shown below:

In the Claims

In Claim 1, Column 24, Line 23, delete "device$_i$" and insert --device;--.

In Claim 18, Column 28, Line 26, delete "level$_i$" and insert --level;--.

Signed and Sealed this
Twenty-ninth Day of August, 2023

*Katherine Kelly Vidal*

Katherine Kelly Vidal
*Director of the United States Patent and Trademark Office*